US008538913B2

(12) United States Patent
Bolstad et al.

(10) Patent No.: US 8,538,913 B2
(45) Date of Patent: Sep. 17, 2013

(54) TEST STRATEGY SYSTEM AND METHOD FOR ACCOUNTS HELD DIRECT AT-FUND

(75) Inventors: Beth Bolstad, Minnetonka, MN (US); Debbie Counce, Brooklyn Center, MN (US); Elizabeth Gray, Minneapolis, MN (US); Alana King, Champlin, MN (US); Carla Nelson, Burnsville, MN (US)

(73) Assignee: American Express Travel Related Services Company, Inc., New York, NY (US)

( * ) Notice: Subject to any disclaimer, the term of this patent is extended or adjusted under 35 U.S.C. 154(b) by 91 days.

(21) Appl. No.: 13/227,338

(22) Filed: Sep. 7, 2011

(65) Prior Publication Data

US 2012/0011154 A1 Jan. 12, 2012

Related U.S. Application Data

(60) Continuation of application No. 12/855,386, filed on Aug. 12, 2010, now Pat. No. 8,037,020, which is a continuation of application No. 11/839,732, filed on Aug. 16, 2007, now Pat. No. 7,801,849, which is a division of application No. 10/772,199, filed on Feb. 4, 2004, now Pat. No. 7,287,040.

(60) Provisional application No. 60/513,300, filed on Oct. 21, 2003.

(51) Int. Cl.
*G06F 17/00* (2006.01)
*G06F 17/30* (2006.01)

(52) U.S. Cl.
USPC .......................................... 707/602; 707/803

(58) Field of Classification Search
USPC ................. 715/514, 503, 522, 517, 523, 906; 707/602, 803
See application file for complete search history.

(56) References Cited

U.S. PATENT DOCUMENTS

| 5,278,978 A | 1/1994 | Demers et al. |
| 5,293,615 A | 3/1994 | Amada |
| 5,377,203 A | 12/1994 | Khan |
| 5,487,169 A | 1/1996 | Vraney et al. |
| 5,608,874 A | 3/1997 | Ogawa et al. |
| 5,819,268 A | 10/1998 | Hackett |
| 5,845,283 A | 12/1998 | Williams et al. |
| 5,963,731 A | 10/1999 | Sagawa et al. |
| 5,966,716 A * | 10/1999 | Comer et al. ......................... 1/1 |

(Continued)

OTHER PUBLICATIONS

USPTO; Notice of Allowance dated Jun. 10, 2011 in U.S. Appl. No. 12/855,386.

(Continued)

*Primary Examiner* — Yicun Wu
(74) *Attorney, Agent, or Firm* — Snell & Wilmer L.L.P.

(57) ABSTRACT

A system and method for a user to test and transfer data from a client's database or network to a host's database or network is disclosed. A user acquires data information from a client and the user uses this information to generate a spreadsheet, and to populate the spreadsheet with assumed values based on the information received from the client. The user requests and receives a test file from the client and uses a developed algorithm to reformat the file so that it is consistent with the host's database configuration. The user determines the consistency between the reformatted file and the host's database by comparing the reformatted file to the previously generated spreadsheet. Any inconsistencies identified alert the user that the file reformatting algorithm needs updating.

20 Claims, 4 Drawing Sheets

(56) References Cited

U.S. PATENT DOCUMENTS

| | | | |
|---|---|---|---|
| 5,974,248 A | 10/1999 | Graef | |
| 5,995,980 A | 11/1999 | Olson et al. | |
| 6,075,529 A | 6/2000 | Tamegaya | |
| 6,081,811 A | 6/2000 | Nilsson | |
| 6,148,277 A | 11/2000 | Asava et al. | |
| 6,148,427 A | 11/2000 | Sherwood et al. | |
| 6,151,608 A * | 11/2000 | Abrams | 707/679 |
| 6,195,658 B1 | 2/2001 | Comito et al. | |
| 6,249,786 B1 | 6/2001 | Wadewitz | |
| 6,260,043 B1 | 7/2001 | Puri et al. | |
| 6,269,474 B1 | 7/2001 | Price | |
| 6,311,175 B1 | 10/2001 | Adriaans et al. | |
| 6,356,901 B1 | 3/2002 | MacLeod et al. | |
| 6,393,435 B1 | 5/2002 | Gartner et al. | |
| 6,411,395 B1 | 6/2002 | Bahrs et al. | |
| 6,421,620 B1 | 7/2002 | Kotlow | |
| 6,587,969 B1 | 7/2003 | Weinberg et al. | |
| 6,601,203 B1 | 7/2003 | Asano et al. | |
| 6,615,220 B1 | 9/2003 | Austin et al. | |
| 6,622,271 B1 | 9/2003 | Colby et al. | |
| 6,631,382 B1 | 10/2003 | Kouchi et al. | |
| 6,631,497 B1 * | 10/2003 | Jamshidi et al. | 715/205 |
| 6,636,864 B1 | 10/2003 | Owen, Jr. | |
| 7,007,046 B2 | 2/2006 | Manley et al. | |
| 7,039,645 B1 | 5/2006 | Neal et al. | |
| 7,532,144 B2 | 5/2009 | Yamaji et al. | |

OTHER PUBLICATIONS

USPTO; Office Action dated Jul. 20, 2006 in U.S. Appl. No. 10/772,199.

USPTO; Notice of Allowance dated May 15, 2007 in U.S. Appl. No. 10/772,199.

USPTO; Notice of Allowance dated May 14, 2010 in U.S. Appl. No. 11/839,732.

\* cited by examiner

TEST STRATEGY SYSTEM AND METHOD FOR ACCOUNTS HELD DIRECT AT-FUND

CROSS REFERENCE TO RELATED APPLICATIONS

This application is a continuation of, and claims priority to and the benefit of, U.S. Ser. No. 12/855,386 filed on Aug. 12, 2010 and entitled "Test Strategy System and Method for Accounts Held Direct At-Fund." The '386 application is a continuation of, and claims priority to and the benefit of, U.S. Pat. No. 7,801,849 issued on Sep. 21, 2010 and entitled "Test Strategy System and Method for Accounts Held Direct At-Fund" (aka U.S. Ser. No. 11/839,732 filed on Aug. 16, 2007). The '849 patent is a divisional of, and claims priority to and the benefit of, U.S. Pat. No. 7,287,040 issued on Oct. 23, 2007 and entitled "Test Strategy System and Method for Accounts Held Direct At-Fund" (aka U.S. Ser. No. 10/772,199 filed on Feb. 4, 2004). The '040 patent is the non-provisional of and claims priority to, and the benefit of, U.S. Provisional Patent Application U.S. Ser. No. 60/513,300 filed on Oct. 21, 2003 and entitled "Test Strategy System and Method". All of which are hereby incorporated by reference.

FIELD OF INVENTION

This application generally relates to data testing and transferring, and more particularly, to a system and method to, test, verify, reformat, and transfer acquired data for compliance on a host database or network system.

BACKGROUND OF THE INVENTION

In today's market, the operations of companies move at a much faster pace than in the past due to increasing technological advances, specifically in the field of information exchange and data management. It is common practice for companies to establish relationships with each other and engage in a manner that incorporates the cooperative use of data. In furthering the relationship between companies and their respective interests, it is often necessary to transfer information and data from one company to another. In many instances the data existing on a database or network of one company may not conform in structure or format with the database or network of the other company. As such, it is often the unenviable task of an internal Information Technology (IT) Department to transform acquired data such that the data can exist on its database or network in a manner consistent with the already existing data.

Furthermore, lack of a structured, consistent approach for transforming data often creates risk of implementation errors and delays in project delivery due to unexpected results during a test phase. For example, computer code is usually developed by a company to provide instructions on how to transform data to comport with the receiving company's database or network. However, errors in code design or execution can significantly delay the use of the transferred data because, for example, the error must be corrected and the entire transformation of the data re-executed.

In an effort to minimize problematic transfer of the desired data, a company can mitigate significant administrative costs by first working with smaller, transferred test files. These test files are typically comprised of test data as a limited precursor for the entire database log. This limited data is then manipulated and tested to confirm the adequacy of the algorithms used to transform the data to the format of the receiving company's database. In this sense, the company can utilize their resources and control costs in a more efficient manner.

In the past, a company may receive a test file when it wished to implement a new or modified business relationship with another company. But notably, a typical company's internal systems do not typically follow a structured or consistent testing effort with other companies. One reason for the lack of structured testing is that it usually included significant, time consuming, and often superfluous coordination with companies selected for certain projects. In an effort to alleviate this excessive coordination, a structured, consistent, repetitive method is needed to preemptively identify the desired data information, devise a process to transform the data, and test this transforming process on test data received from an outside company. In this fashion, errors in the transformation can be readily identified and corrected before the entire data log is transformed. As such, the costly process of trial and error of numerous computer code corrections, which is commonly used for the data transformation process and manipulation of the large, acquired databases, can be minimized or eliminated.

SUMMARY OF THE INVENTION

The present invention provides a system and method for the testing and transfer of data from a client to a host. In one aspect of the present invention, data testing and transfer is accomplished by identifying the specific data to be acquired from a client's database or network and determining the desired format of the data for the host's database or network. The format and values of the client's data is assumed and entered onto a spreadsheet. The spreadsheet includes specific, predetermined headings to exist for the data fields and then assumed, fictitious, client data is entered into the data fields, based on the host's data format requirements. The spreadsheet is forwarded to the client for feedback on the entered data field headings, format of the fictitious assumed data values, and overall organization of the spreadsheet.

In order for the client's data to exist on the host's network in a compatible format, an algorithm is developed by the host to reformat the client's data. The host receives a test file and reformats this test file utilizing the developed algorithm. The reformatted test file is then compared to the created spreadsheet, and the system notes inconsistencies between the file and spreadsheet. If any changes are necessary, the algorithm is subsequently updated to format the data in the desired manner, namely consistent with the format of the spreadsheet. After the system verifies the data and reformatting, the entire client database file can be routed to the host, duplicated to protect the original file information, reformatted using the updated algorithm, and uploaded to the host's database or network.

BRIEF DESCRIPTION OF THE DRAWINGS

A more complete understanding of the present invention may be derived by referring to the detailed description and claims when considered in connection with the figures, where like reference numbers refer to similar elements throughout the figures, and:

DETAILED DESCRIPTION OF EXEMPLARY EMBODIMENTS

Figure 1:
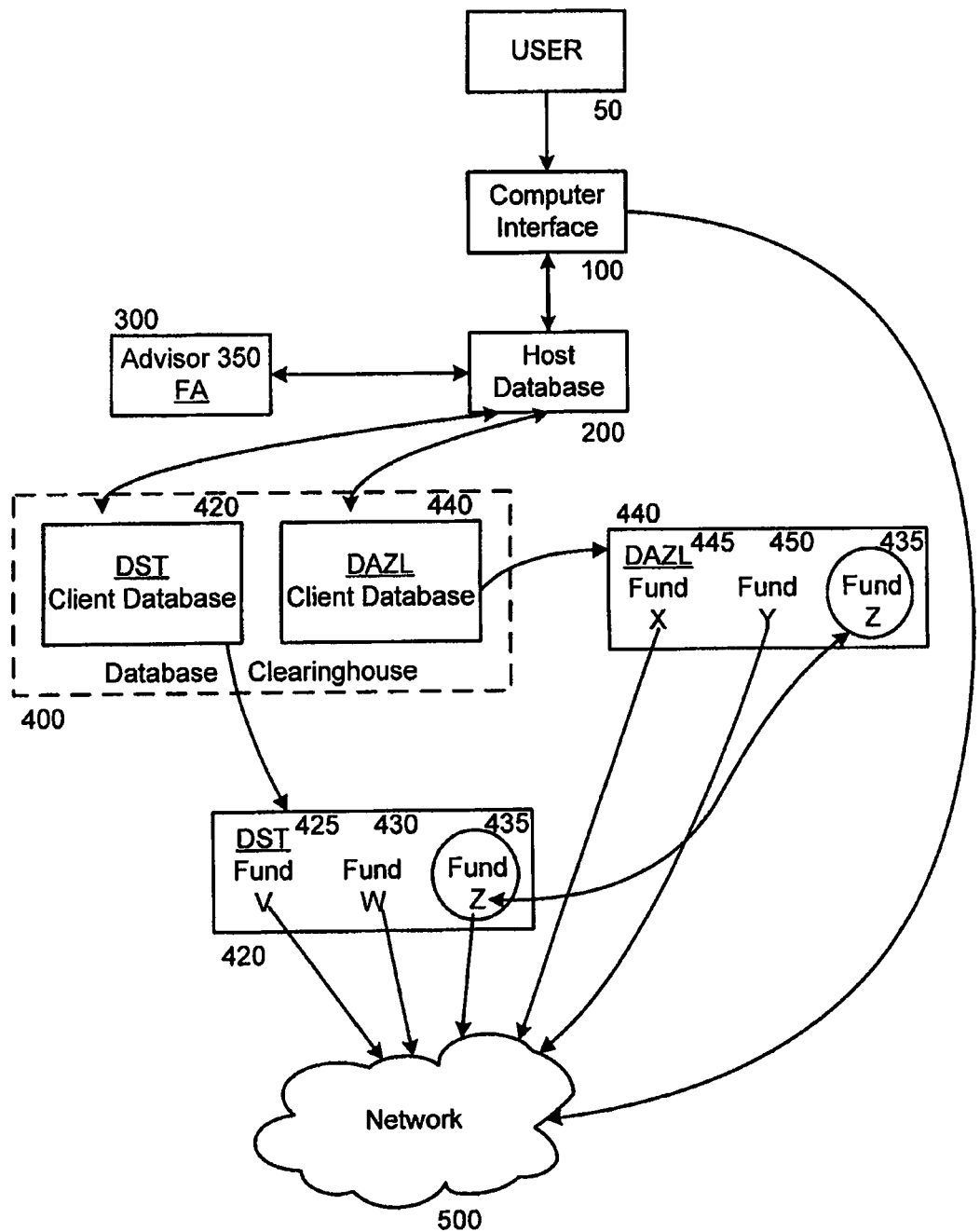
FIG. 1 depicts a block diagram illustrating an exemplary system of the present invention.

The detailed description of exemplary embodiments of the invention herein makes reference to the accompanying Figures, which depict the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented and/or other steps may be omitted altogether while still attaining the same or a similar result.

Moreover, it should be appreciated that the particular implementations depicted and described herein are illustrative of the invention and its best mode and are not intended to otherwise limit the scope of the present invention in any way. Indeed, for the sake of brevity, certain sub-components of the individual operating components, conventional data networking, application development and other functional aspects of the systems may not be described in detail herein. Furthermore, the connecting lines depicted in the various figures contained herein are intended to represent exemplary functional relationships and/or physical couplings between the various elements. It should be noted that many alternative or additional functional relationships or physical connections may be present in a practical system.

In general, the present invention facilitates the creation of test conditions and criteria for test data, in order to establish substantial synchronicity across multiple systems. In an exemplary embodiment, the present invention includes process delivered test files that prove or disprove assumptions made in creating formatting specifications for a system. The test files also facilitate documentation of expected results to improve testing efficiency and quality across the multiple systems involved in a test effort. While the present invention may be described herein with respect to industries that have a relationship with various Fund Families and clearinghouses, the system and method of the present invention may be implemented in any industry that may benefit from structured testing across multiple systems.

The invention also improves the quality of a testing effort such that the effort is more likely to lead to the delivery of the test phase on time and within budget. The invention also helps to reduce implementation risk by establishing expected test results to facilitate research and test validation. The invention also reduces the test phase by reducing or eliminating the unstructured testing which typically requires longer periods to research issues.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

With respect to the system components, in an exemplary embodiment of the invention and with reference to FIG. 1, the system may include one or more advisors 350. The advisors may be the end users of the present invention and the advisors may include any person, entity, business, hardware and/or software suitably configured to offer financial planning advice. Advisors 350 may be organized into a coordinated set of personal advisors 300 herein referred to as "FA" (financial advisors). The FA may interact with general public consumers to offer financial planning advice which may include, for example, a "529 Plan" option. A "529 Plan" is a government sanctioned, financial plan more commonly referred to as a college educational savings plan which allows for money in the account to obtain interest, free of federal taxes.

Referring to FIG. 1, a user 50 may act on behalf of a host and may be employed or contracted to implement the present invention for the benefit of a host. The user may be an individual, group, employee, contractor, software and/or hardware configured to execute the following steps or achieve the desired outcome as described by the present invention. The user works in coordination with the FA to carry out the objective of the present invention. The user may execute the following steps or achieve the desired outcome as described by the present invention to facilitate the ability of the FA to offer financial planning advice.

With respect to FIG. 1, an embodiment of the invention includes at least one database clearinghouse 400. The database clearinghouse includes any person, entity, software and/or hardware suitably configured to store third party information. In one embodiment, the third party information may be related to independent Fund Families. The clearinghouses are a type of electronic data warehouse used by Fund Families to store a large amount of the Fund Family data. The clearinghouses provide an efficient and secure manner to store, send or receive Fund Family data that would otherwise occupy significant, internal electronic resources of the Fund Families.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure.

One skilled in the art can also appreciate that, for security reasons, any databases, systems, devices, servers or other components of the present invention may comprise of any combination thereof at a single location or at multiple locations, wherein each database or system includes any of various suitable security features, such as firewalls, access codes, encryption, decryption, compression, decompression, and/or the like.

As discussed herein as an exemplary embodiment, the clearinghouses may include known clearinghouses such as DST 420 or DAZL 440. DST may include several Fund Families, for example Fund V 425, Fund W 430, and Fund Z 435, wherein V, W, and Z represent Fund Families from external financial institutions. Although only three Fund Families are depicted for illustrative purposes only, the clearinghouse may be an entity that receives data and information from any number of external Fund Families. Moreover, DAZL is a clearinghouse that includes Fund Families such as, for example, Fund X 445, Fund Y, 450, and Fund Z 435. Again, DAZL Fund Families are not limited to the three depicted herein, but may comprise of any number of Fund Families. Furthermore, a clearinghouse may not only maintain data from the Fund Families, but in some instances at the discretion of the Fund Family, may be configured to transfer Fund Family data from one clearinghouse to another. For example, as depicted in FIG. 1, Fund Z 435, is transferred from the DST clearinghouse 420 to the DAZL clearinghouse 440.

The foregoing exemplary system components may be used to facilitate an exemplary method for testing and transferring data in accordance with the present invention. Moreover, the various system components discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: client data; financial institution data; and/or like data useful in the operation of the present invention. As those skilled in the art will appreciate, user computer may include an operating system (e.g., Windows NT, 95/98/2000/XP, OS2, UNIX, Linux, Solaris, MacOS, etc.) as well as various conventional support software and drivers typically associated with computers. User computer can be in a home or business environment with access to a network. In an exemplary embodiment, access may through the Internet through a commercially-available web-browser software package.

The present invention system and method may be implemented on or use a network wherein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. The invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet may generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

The various system components described herein may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods. See, e.g., GILBERT HELD, UNDERSTANDING DATA COMMUNICATIONS (1996), hereby incorporated by reference.

In an exemplary embodiment of the present invention, a user acquires a clearinghouse data layout 100 via a secured/encrypted electronic network communication and delivery system, wherein the data layout is acquired by the user utilizing a computer interface system as described above to interact with the clearinghouse to acquire the data. However, the data layout may be acquired in any format or in any manner that may readily depict an accurate layout of the data, for example; diskette, CD, hard copy such as paper, fax, mail receipt and the like.

Figure 2:
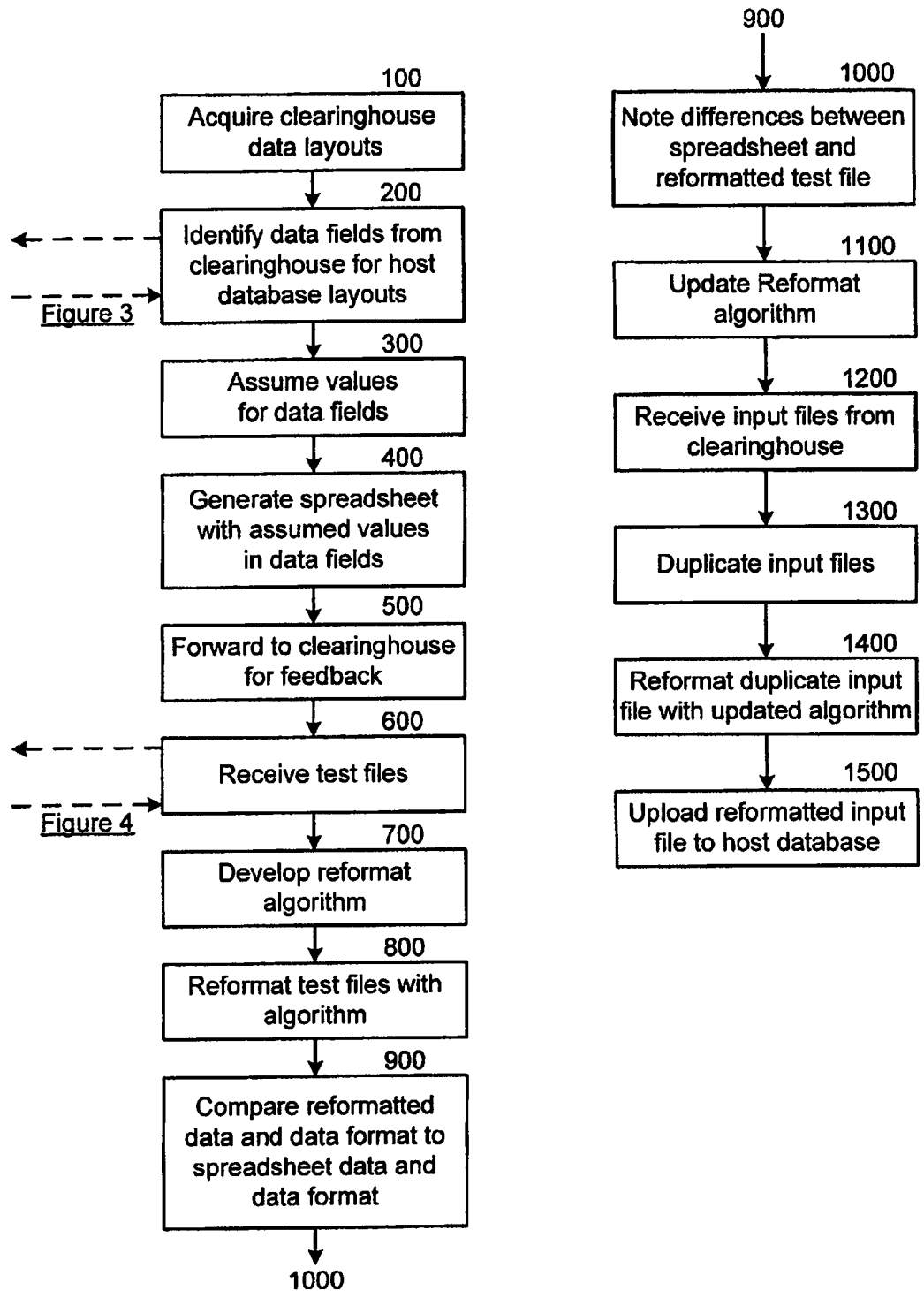
FIG. 2 depicts a flowchart illustrating an exemplary method in accordance with the present invention.

As depicted in FIG. 2, a user next identifies by manual or automated fashion, desired data fields from the acquired clearinghouse data layout as a reference to design a host database layout 200. For example, a host database layout may comprise of data fields such as, for example, name, address, account number, number of fund shares, commission due to a financial advisor, and the like. Also, the user identifies in what desired manner to depict the information, for example; name followed by address followed by account number, and so forth. One skilled in the art can further appreciate that the database layout may comprise of any type of information or data piece. For example, information or data that is symbolic, numeric, alpha, alpha-numeric, auditory, cryptic, or any type of information that may be transferred and detected.

Figure 3:
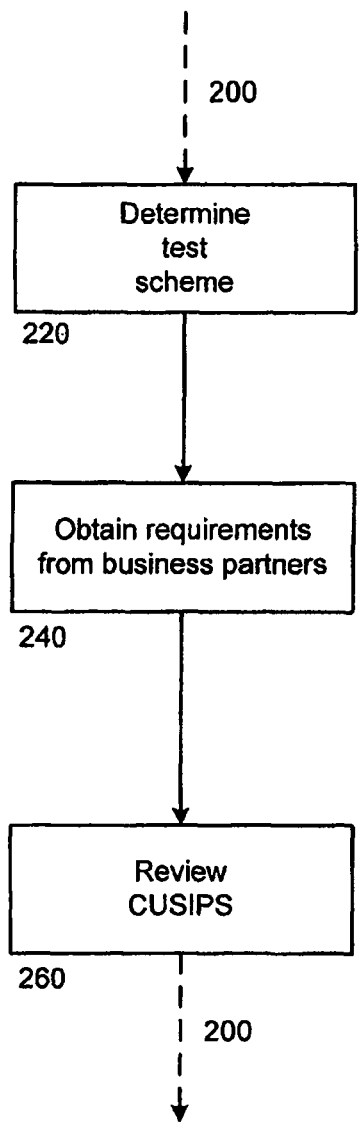
FIG. 3 depicts a flowchart further illustrating an exemplary method, from FIG. 2, to identify data fields from a clearinghouse for a host database layout.

In one aspect of the proposed invention, the user may optionally employ further exemplary method steps to identify data fields from a clearinghouse for a host database layout and depicted in FIG. 3. The user may determine a test scheme 220. The test scheme may include information, a data field, or data values added to the identified data fields layout to make the host's database layout more recognizable to the host. For example, the user may add a familiar numbering, naming, or symbolic feature to the identified data fields layout in order to facilitate following the movement of the data fields layout as it is manipulated by the herein described method. The factors used to determine the test scheme are generally based upon subjective criteria determined by the user to facilitate the objective of the present invention. The test scheme is host information linked to the acquired data fields. As the data field information is manipulated, the user can more readily track the results of the manipulation by following the corresponding, linked test scheme information.

Continuing with an exemplary method depicted in FIG. 3, the user may obtain requirements from business partners 240. These requirements are the input from FA's compliance who relay information regarding typical financial details that compliments the test scheme information described above. An example of obtained requirements from business partners may include, the amount of equity in a given account, an electronic flag to identify a specific account if a parameter of interest develops, specific account rules, and the like.

The user may also include industry standard information specific to the industry of current interest. For example, the proposed invention is described in terms of transferring and testing data from a 529 financial plan. As such, a proper industry standard may include a CUSIP, FIG. 3, 260. One skilled in the art can appreciate that a CUSIP is a nine-character number that uniquely identifies a particular security. CUSIP is an acronym for the Committee on Uniform Securities and Identification Procedures, the standards body that created and maintains the classification system.

Returning to the exemplary method depicted in FIG. 2, it depicts the step wherein a user may assume values to populate data fields 300 that were identified and laid out in 200. Assumed values may comprise of fictional information that the user may deem reasonable for the respective data field being populated. For example, the user may assume a fictitious nine digit number to populate the social security number data field, as the user would be expected to eventually receive a real nine digit number to represent a social security number. This step allows the user to forego typical delays in attaining actual client information. Next, a user may generate a spreadsheet using earlier identified data fields and the assumed data values. The user may then populate the spreadsheet with said assumed values in the data fields 400. The spreadsheet may comprise of a computer program such as Excel, Lotus 1-2-3, VisiCalc, and the like. However, any means may be used to generate and populate a spreadsheet, either electronic or manual.

In an exemplary embodiment of the present invention a user may forward by any means described herein, to a clearinghouse the above generated spreadsheet to obtain feedback from the clearinghouse 500. The feedback from the clearinghouses provides comment on the overall organization of the generated spreadsheet, more specifically the data field placement, and assumed data format.

In a continuing embodiment of the present invention, a user may receive test files from the client 600. The received test files contain limited test data to use in the present invention as a precursor to the entire client database to be transferred and reformatted. In this manner, data may be more efficiently manipulated using the present invention. One skilled in the art may appreciate that any account numbers, names, Social Security Numbers or other potentially identifiable data received from a client test file may be 'mocked;' that is, the test data within the test file may be created to comply with protection of the client's customer's privacy. Moreover, the client may leave some fields intentionally empty to protect the client's test or production environments, and that data may be created and updated in the test files. The updates may occur at the client's company site. Moreover, test files may be received by any means described herein.

Figure 4:
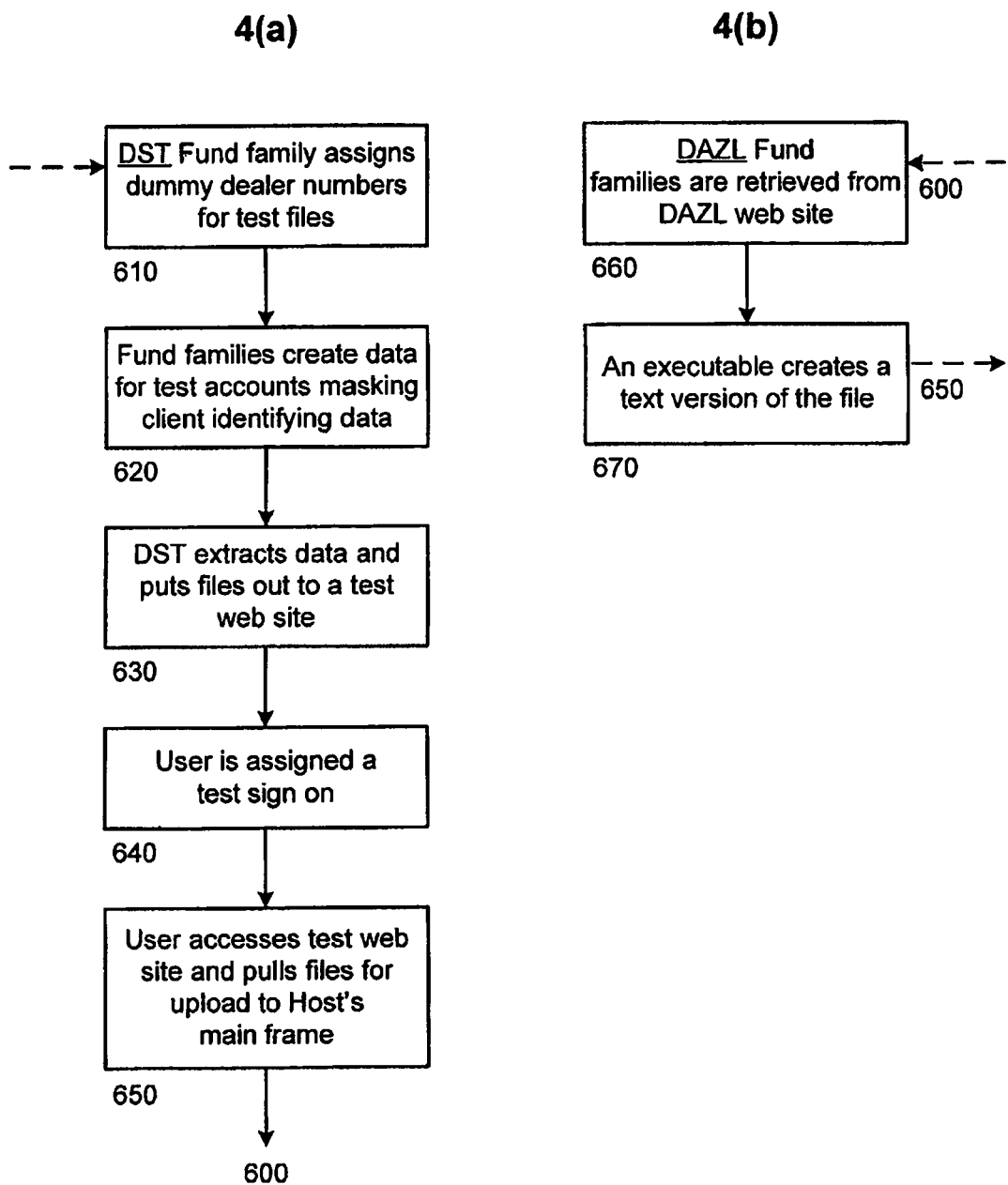
FIGS. 4(a) and 4(b) depict flowcharts further illustrating an exemplary method, from FIG. 2, of how test files may be received from the client.

The method steps by which the user may receive test files from the client is optionally depicted in FIGS. 4(*a*) and 4(*b*), wherein FIG. 4(*a*) depicts an exemplary method to receive a test file from a DST clearinghouse and FIG. 4(*b*) depicts an exemplary method to receive a test file from a DAZL clearinghouse. A clearinghouse Fund Family may assign a dummy dealer number for test files 610 and depicted in FIG. 4(*a*). The dummy dealer number is a number unique to a Fund Family and identifies the Fund Family from the number of Fund Families that maintain their databases with the clearinghouse. The dealer number is a dummy in this situation, or more particularly fictitious, and may be used to merely facilitate the execution of the method steps in the present invention. In a further embodiment of this exemplary method step, the clearinghouse is a DST clearinghouse.

The Fund Families create data for test file accounts masking client identifying data 620. In order to create test files for which the host may receive, the Fund Families create the data to be sent to the host. This data comprises information that may ultimately be reformatted by the host from the format of the client's database to the format of the host's database. The data may comprise general account information as well as sensitive, client proprietary information. To protect sensitive information, the Fund Families may send over test files with any sensitive information in a masked, encrypted, or deleted form.

A clearinghouse such as DST may extract the data for test files from their databases and put the test files out to a test web site 630. The test web site may be a temporary or permanent web site used to facilitate the transfer of data by centralizing it in a readily accessible location. In the present invention, a web site is used as a central location to maintain test files to be accessed by the host, however, it should be appreciated that any means other than a web site may be used to allow access to a test file.

It should be appreciated that the computers discussed herein may provide a suitable website or other Internet-based graphical user interface which may accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Intervase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service which receives a request from a browser which includes a URL (http://yahoo.com/stockquotes/ge) and an IP address (123.56.789). The web service retrieves the appropriate web pages and sends the web pages to the IP address.

In an exemplary embodiment of the present invention, a user is assigned a test sign on 640. The test sign on is an assigned, predetermined or random password that allows access to a secure link on the test web site from which the test files may be accessed. The test sign on is assigned by the clearinghouse and allows the user to be positively identified, promoting a secure and controllable access to the test files.

A user may access the web site and retrieve the test files for upload to a main frame 650. The data may be retrieved and uploaded via conventional data streaming. The main frame may comprise of the host's primary computer processing database or network system. However, one skilled in the art may appreciate that the retrieval and upload may not be limited to only a mainframe. The retrieved information may optionally be downloaded onto any media described herein for storing data. Moreover, the retrieval may occur on alternate hardware such as a personal PC, laptop computer, palm pilots, and the like.

In an exemplary embodiment of the present invention and depicted in FIG. 4(*b*), DAZL Fund Families are retrieved from DAZL web site 660. The method steps previously described herein are followed by the DAZL Fund Families as well. However, it can be appreciated that a retrieved test file, retrieved in the manner as described above, may additionally employ an executable to create a text version of the files for further 670.

Returning to the exemplary embodiment of the present invention depicted in FIG. 2, a user develops a reformatting algorithm 700. The reformatting algorithm includes a designed, structured computer program comprised of sequential steps to carry out the object of the computer program. The computer program facilitates the operation wherein the received test file data may be entered in some existing format and subsequently transformed by the computer program to a format consistent with the host's database or network. The computer program may be written in any form recognizable by the host's computer system to carry out the necessary operation. For example; C, C++, Java, COBOL, assembler, PERL, Visual Basic, SQL Stored Procedures, extensible markup language (XML), and the like. One skilled in the art can appreciate, that any method may be utilized, electronic or otherwise, to carry out the transformation process of the data. Subsequently a user may reformat the received test files with the developed reformatting algorithm 800.

In an exemplary embodiment as depicted in FIG. 2, a user may compare the data and data format of the reformatted test file to the data and data format of the earlier described generated spreadsheet 900. This step may reveal any irregularities with the reformatting algorithm, wherein such irregularities may be determined by discrepancies in comparing the data. In the exemplary embodiment of the present invention, the comparison may be executed visually. For example, a user may visually compare the data in Field One of the reformatted test file to Field One of the generated spreadsheet. However, one skilled in the art can appreciate that any means may be used to accurately execute the comparison. For example, a manual, or computer executed, system may be developed to automate this comparison step.

In a continuing exemplary embodiment of the present invention, the user may identify the differences between the generated spreadsheet and the reformatted test files 1000. In order to identify the inconsistencies between the reformatted test file and the generated spreadsheet, a method may be used to identify the differences. In an exemplary embodiment of the present invention, the inconsistencies are identified by highlighting cells in the spreadsheet that contain the inconsistent data by using different colors. For example; a yellow highlighted cell indicates a change may be required for input data to map to the generated spreadsheet, a green highlighted cell indicates a change may be completed on the generated spreadsheet to map to input data, and a blue highlighted cell indicates change is required for both input data and the generated spreadsheet.

In an exemplary embodiment of the present invention, a user may update the reformatting algorithm 1100 wherein the updated algorithm properly reformats the client's test data in a manner that is consistent with the data on the host's database and/or network. Test data is generally deemed consistent when the data is set in the proper data fields in the proper data format. For example; using a name, an address, and a social security number (SSN) for illustrative purposes. If the host's database depicts a name, an address and a SSN in fields A, B, and C respectively, the reformat algorithm should take the test file data and transform it so that the name, address, and SSN from the test file data are depicted in fields A, B, and C respectively as well. In a further aspect of the present invention, test data exists in a consistent manner if it not only occupies the proper fields, but also if it is formatted properly within the field. For example, assuming a name is formatted into the proper field, it should also exist in the proper form. If the name field requires alpha-numeric characters, it should transform the test data into the proper alpha-numeric characters and in the proper order.

One example of a benefit of the present invention includes, when coding specifications for formatting an owner's name, the test files received from the Fund Families may be reviewed following a walkthrough. If an error is discovered in the coding specifications that could be corrected before the data is actually loaded, the discovery of the error may result in a reducing of time to discover the error after the load, sending the fix offshore, and retesting. In close connection with this example, if a transaction from one of the Fund Families is not contained in certain documentation and the Fund Family is in the process of migrating from the DST to DAZL clearinghouse, the testing of the present invention may uncover an error on their system, thereby allowing them to correct the error prior to the migration.

In reference to FIG. 2, a user may receive an input file from a clearinghouse 1200. The input files may be received by any means described herein. As described above, once the host has finalized the updates to the reformatting algorithm, the host may request and receive the input file from the clearinghouse to reformat the entire desired client database. The input file contains the actual data and/or information to be reformatted into the format of the host database.

In a continuing exemplary embodiment of the present invention, as depicted in FIG. 2, the user may duplicate the input files received from the clearinghouse 1300. Often, in transferring data from one entity to another, data may become distorted, erased, transformed, reformatted, etc. Method step 1300 prevents loss of original information by providing for duplication of a received input file; more specifically a received input file from a clearinghouse wherein the subsequent duplicated file may be used for further data manipulation. The original input file may thereby be saved to protect the integrity of the original data and information. One skilled in the art can appreciate that the input file may be duplicated by any means proper. For example, the input file may be duplicated onto a secondary network or database, hard drive, DVD, CD-ROM, floppy disk, magnetic media, photo-static copy, hard copy, or any other media that has the ability to accurately depict the data and information contained on the original input file.

In a continuing exemplary embodiment of the present invention depicted in FIG. 2, a user may reformat the duplicate input file using the updated algorithm 1400 to create a reformatted input file. Because the algorithm was determined to properly reformat the client's test file by the above method steps, the associated client database may now be reformatted in a manner that is consistent with the host's database and/or network.

The user may then upload the reformatted input file to the host database or network 1500. In this sense, the uploaded file may now exist in a condition such that it may be accessed by a FA to accurately retrieve data information in order to effectively serve a customer's needs.

In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file may selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

It should be appreciated that the system and method may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like.

The present invention may described herein with reference to, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims of the invention. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein may required for the practice of the invention unless expressly described as "essential" or "critical".

We claim:

1. A method comprising:
   creating, by a computer-based system for facilitating a transfer of data from a client database to a host database, a reformatted test file with a test file using an algorithm, wherein said algorithm is configured to reformat data associated with a data field from said client database and desired for said host database;
   identifying, by the computer-based system, a change that would substantially conform said reformatted test file to a spreadsheet;
   creating, by the computer-based system, an updated algorithm from said algorithm which incorporates said change;
   creating, by the computer-based system, a reformatted input file by applying said updated algorithm to an input file; and
   uploading, by the computer-based system, said reformatted input file to said host database.

2. The method of claim 1, further comprising receiving and analyzing a client record layout to identify said data fields desired by a host.

3. The method of claim 2, wherein said receiving said client record layout further comprises receiving said client record layout from a database clearinghouse.

4. The method of claim 3, wherein said receiving said client record layout further comprises receiving said client record layout from said database clearinghouse further comprises receiving said client record layout from at least one of DST and DAZL, database clearinghouse.

5. The method of claim 1, further comprising receiving a 529 plan test file from said client database.

6. The method of claim 1, further comprising at least one of:
   determining an order to organize said data fields into said spreadsheet;
   determining data field headers from said data fields and populating at least a portion of said data field headers into said spreadsheet in said order; and
   determining parameters for said data fields and formatting said data fields using said parameters.

7. The method of claim 6, wherein said determining parameters for said data fields and formatting said data fields using said parameters further comprises formatting said data fields to include at least one of an alphabetical, a numeric, and an alpha-numeric character.

8. The method of claim 1, further comprising:
   generating fictitious data in accordance with said parameters of said data fields;
   populating at least a portion of said fictitious data into said spreadsheet; and
   forwarding said spreadsheet to said client database for feedback regarding the accuracy and the organization of said spreadsheet.

9. The method in claim 1, further comprising:
   comparing data fields from said reformatted test file to data fields from said spreadsheet;
   comparing parameters from said data fields from said reformatted test file to parameters from said data fields from said spreadsheet;
   comparing data values from said data fields from said reformatted test file to data values from said data fields from said spreadsheet; and
   identifying inconsistencies between said data values from said data fields from said reformatted test file to said data values from said data fields from said spreadsheet.

10. The method of claim 9, wherein said identifying inconsistencies between said data values from said data fields from said reformatted test file to said data values from said data fields from said spreadsheet further comprises at least one of:
   identifying said inconsistencies by a visual comparison, and
   identifying said inconsistencies by an automated comparison.

11. The method of claim 1, further comprising copying at least a portion of said input file to create at least a portion of a duplicate input file to minimize the possibility of losing information from said input file.

12. The method of claim 1, further comprising:
   identifying, by the computer-based system, at least one data field from said client database desired for said host database;
   incorporating, by the computer-based system, said data field in a spreadsheet; and populating, by the computer-based system, at least a portion of said data field in said spreadsheet with assumed data values.

13. The method of claim 1, further comprising receiving, by the computer-based system, said input file from said client database.

14. The method of claim 1, wherein said test file is from said client database.

15. A system comprising:
a processor for facilitating a transfer of data from a client database to a host database,
a tangible, non-transitory memory configured to communicate with the processor,
the tangible, non-transitory memory having instructions stored thereon that, in response to execution by the processor, cause the processor to perform operations comprising:
creating, by the processor, a reformatted test file with a test file using an algorithm, wherein said algorithm is configured to reformat data associated with a data field from said client database and desired for said host database;
identifying, by the processor, a change that would substantially conform said reformatted test file to a spreadsheet;
creating, by the processor, an updated algorithm from said algorithm which incorporates said change;
creating, by the processor, a reformatted input file by applying said updated algorithm to an input file; and
uploading, by the processor, said reformatted input file to said host database.

16. The system of claim 15, further comprising receiving and analyzing a client record layout to identify said data fields desired by a host.

17. The system of claim 15, further comprising at least one of:
determining an order to organize said data fields into said spreadsheet;
determining data field headers from said data fields and populating at least a portion of said data field headers into said spreadsheet in said order; and
determining parameters for said data fields and formatting said data fields using said parameters.

18. The system of claim 17, wherein said determining parameters for said data fields and formatting said data fields using said parameters further comprises formatting said data fields to include at least one of an alphabetical, a numeric, and an alpha-numeric character.

19. The system of claim 15, further comprising:
generating fictitious data in accordance with said parameters of said data fields;
populating at least a portion of said fictitious data into said spreadsheet; and
forwarding said spreadsheet to said client database for feedback regarding the accuracy and the organization of said spreadsheet.

20. An article of manufacture including a non-transitory, tangible computer readable medium having instructions stored thereon that, in response to execution by a computer-based system for facilitating a transfer of data from a client database to a host database, cause the computer-based system to perform operations comprising:
creating, by the computer-based system, a reformatted test file with a test file using an algorithm, wherein said algorithm is configured to reformat data associated with a data field from said client database and desired for said host database;
identifying, by the computer-based system, a change that would substantially conform said reformatted test file to a spreadsheet;
creating, by the computer-based system, an updated algorithm from said algorithm which incorporates said change;
creating, by the computer-based system, a reformatted input file by applying said updated algorithm to an input file; and
uploading, by the computer-based system, said reformatted input file to said host database.

* * * * *